United States Patent
Seki

(10) Patent No.: US 9,122,936 B2
(45) Date of Patent: Sep. 1, 2015

(54) DETECTING DEVICE, DETECTION METHOD, AND COMPUTER PROGRAM PRODUCT

(71) Applicant: KABUSHIKI KAISHA TOSHIBA, Tokyo (JP)

(72) Inventor: Akihito Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 14/064,799

(22) Filed: Oct. 28, 2013

(65) Prior Publication Data

US 2014/0133700 A1    May 15, 2014

Related U.S. Application Data

(63) Continuation of application No. PCT/JP2012/079411, filed on Nov. 13, 2012.

(51) Int. Cl.
G06K 9/00    (2006.01)

(52) U.S. Cl.
CPC ........ *G06K 9/00812* (2013.01); *G06K 9/00805* (2013.01)

(58) Field of Classification Search
CPC ................... G06T 2207/10016; G06K 9/3241; G06K 2209/23
See application file for complete search history.

(56) References Cited

U.S. PATENT DOCUMENTS

| 2006/0013438 A1 | 1/2006 | Kubota |
| 2006/0055776 A1 | 3/2006 | Nobori et al. |
| 2008/0285798 A1 | 11/2008 | Kubota |

FOREIGN PATENT DOCUMENTS

| JP | 2001-331787 | 11/2001 |
| JP | 2006-053890 | 2/2006 |
| JP | 2007-241326 | 9/2007 |

OTHER PUBLICATIONS

International Search Report for PCT/JP2012/079411, mailed Feb. 12, 2013.
Office Action mailed Jul. 29, 2014 in counterpart Japanese Patent Application No. 2013-514456 and English-language translation thereof.
Office Action mailed Jun. 11, 2015 in counterpart Chinese Patent Application No. 201280013215.6 and English-language translation thereof.

*Primary Examiner* — Bhavesh Mehta
*Assistant Examiner* — Amandeep Saini
(74) *Attorney, Agent, or Firm* — Nixon & Vanderhye, P.C.

(57) ABSTRACT

According to an embodiment, a detecting device includes a projecting unit, a calculator, and a detector. The projecting unit is configured to obtain a first projection position by projecting a capturing position of a captured image on a road surface, obtain a second projection position by projecting a spatial position in the captured image on the road surface, and obtain a third projection position by projecting an error position on the road surface. The calculator is configured to calculate an existence probability of an object on a line passing through the first and second projection positions so that an existence probability of the object between the second and third projection positions on the straight line is greater than between the first and third projection positions on the straight line. The detector is configured to detect a boundary between the road surface and the object by using the existence probability.

15 Claims, 15 Drawing Sheets

DETECTING DEVICE, DETECTION METHOD, AND COMPUTER PROGRAM PRODUCT

CROSS-REFERENCE TO RELATED APPLICATION

This application is a continuation of PCT international Application Ser. No. PCT/JP2012/079411, filed on Nov. 13, 2012, which designates the United States; the entire contents of which are incorporated herein by reference.

FIELD

Embodiments described herein relate generally to a detecting device, a detection method, and a computer program product.

BACKGROUND

A conventional technology is known in which estimation of the spatial position of an automobile is done using a plurality of images captured by a plurality of cameras installed in the automobile and using the parallaxes (correspondence relationships) among the images, and in which the boundary between the an object (an obstacle) present around the automobile and the road surface is detected based on the estimated spatial position.

CITATION LIST

However, the conventional technology described above is based on the premise that the parallaxes and the depths among a plurality of images are in a constant relationship. Thus, unless that premise is not satisfied, it is not possible to correctly detect the boundary between an object and the road surface. In that regard, it is an object of the present invention to provide a detecting device, a detection method, and a program that enable detection of the boundary between an object and the road surface even in the case when the parallaxes and the depths among a plurality of images are not in a constant relationship.

DETAILED DESCRIPTION

According to an embodiment, a detecting device includes a first estimating unit, a second estimating unit, a third estimating unit, a projecting unit, a calculator, and a detector. The first estimating unit is configured to estimate a first spatial position relationship between different image capturing positions. The second estimating unit is configured to estimate a spatial position of a spatial position in an estimation-purpose captured image and an error position of the spatial position by using a plurality of captured images at the different image capturing positions and the first spatial position relationship, the estimation-purpose captured image being one of the plurality of captured images. The third estimating unit is configured to estimate a second position relationship between the capturing position of the estimation-purpose captured image and a road surface. The projecting unit is configured to obtain a first projection position by projecting the capturing position of the estimation-purpose captured image on the road surface by using the second position relationship, obtain a second projection position by projecting the spatial position on the road surface, and obtain a third projection position by projecting the error position on the road surface. The calculator is configured to calculate an existence probability of an object on a straight line passing through the first projection position and the second projection position by updating the existence probability so that an existence probability of the object in between the second projection position and the third projection position on the straight line is greater than in between the first projection position and the third projection position on the straight line. The detector is configured to detect a boundary between the road surface and the object by using the calculated existence probability.

Exemplary embodiments are described below in detail with reference to the accompanying drawings.

First Embodiment

Figure 1:
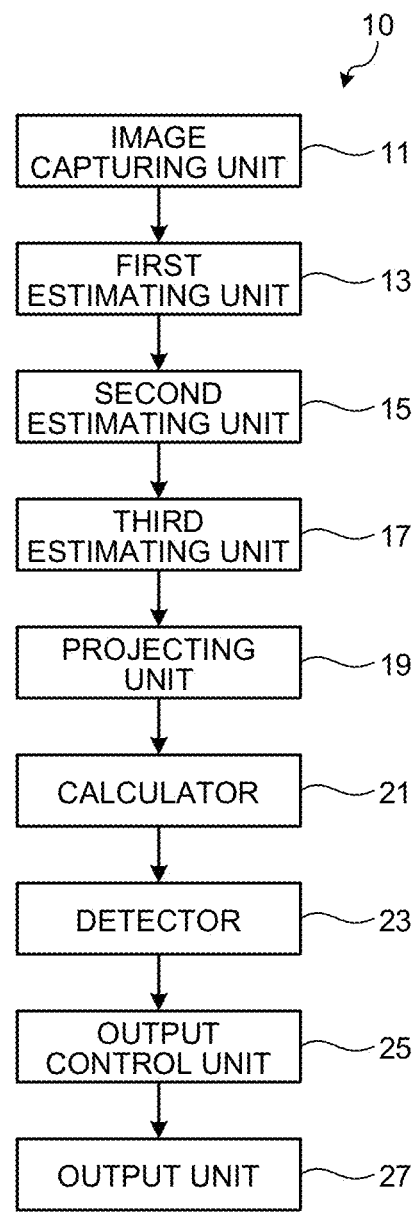
FIG. 1 is a configuration diagram illustrating an example of a detecting device according to a first embodiment.

FIG. 1 is a configuration diagram illustrating an example of a detecting device 10 according to a first embodiment. As illustrated in FIG. 1, the detecting device 10 includes an image capturing unit 11, a first estimating unit 13, a second estimating unit 15, a third estimating unit 17, a projecting unit 19, a calculator 21, a detector 23, an output control unit 25, and an output unit 27.

The image capturing unit 11 may be implemented using, for example, an image capturing device such as a digital camera. The first estimating unit 13, the second estimating unit 15, the third estimating unit 17, the projecting unit 19, the calculator 21, the detector 23, and the output control unit 25 may be implemented by executing programs in a processor such as a CPU (Central Processing Unit), that is, may be implemented using software; or may be implemented using hardware such as an IC (Integrated Circuit); or may be implemented using a combination of software and hardware. The output unit 27 may be implemented using a display device such as a liquid crystal display or a touch-screen display for display output; or may be implemented using an audio device such as a speaker for audio output; or may be implemented using a combination of a display device and an audio device.

In the first embodiment, the explanation is given for an exemplary case in which the detecting device 10 is installed in an automobile so that any obstacle present on the road surface is detected. However, that is not the only possible case. Alternatively, the detecting device 10 may be installed in a mobile object. For example, the detecting device 10 may be installed in an autonomous mobile robot.

Figure 2:
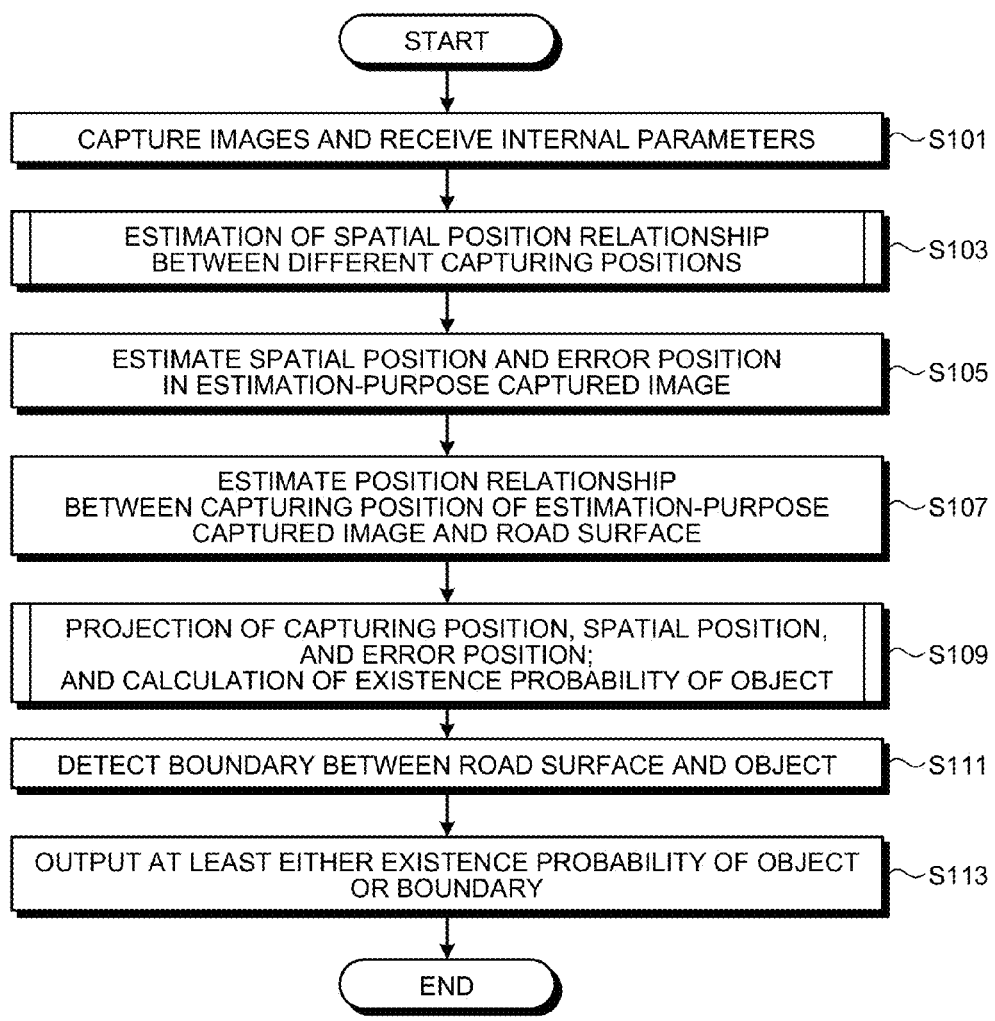
FIG. 2 is a flowchart for explaining an exemplary detecting process according to the first embodiment.

FIG. 2 is a flowchart for explaining an exemplary sequence of steps of a detecting process performed in the detecting device 10 according to the first embodiment.

Firstly, at Step S101, the image capturing unit 11 captures images in chronological order and internal parameters of the image capturing unit 11 (camera) are received. Herein, the internal parameters include the focal length of the lens, the size per pixel, and the image center. In the first embodiment, the internal parameters are expressed as a 3-by-3 matrix.

Figure 3:
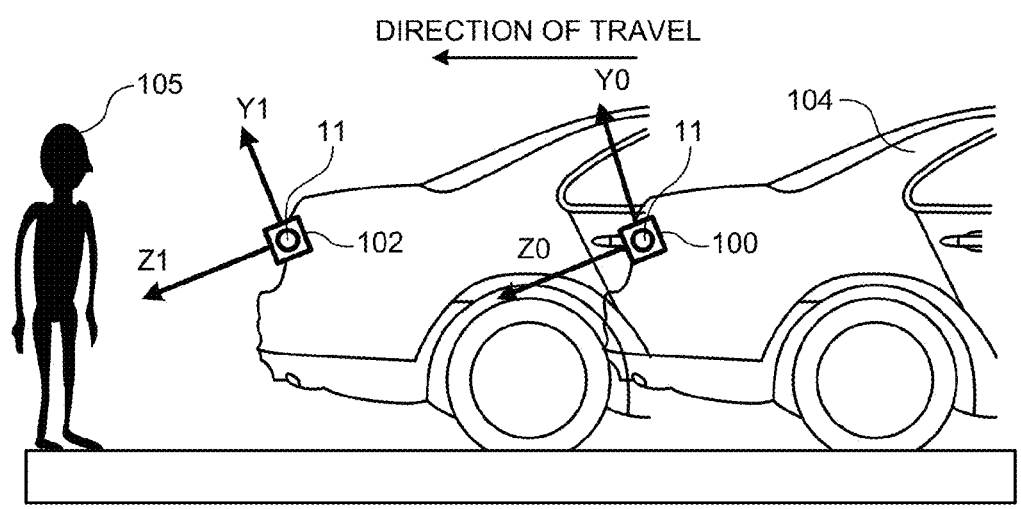
FIG. 3 is an explanatory diagram for explaining an example of the installation location, the movement, and the imaging timing of an image capturing unit according to the first embodiment.

FIG. 3 is an explanatory diagram for explaining an example of the installation location, the movement, and the imaging timing of the image capturing unit 11 according to the first embodiment. In the example illustrated in FIG. 3, the image capturing unit 11 (camera) is disposed on the rear face of a car 104 and is positioned to align with the direction of travel (backward direction), and the car 104 is moving backward (in the direction of travel) in the reverse mode. The image capturing unit 11 captures an image upon reaching a position 100, and also captures an image upon reaching a position 102.

Figure 4A:
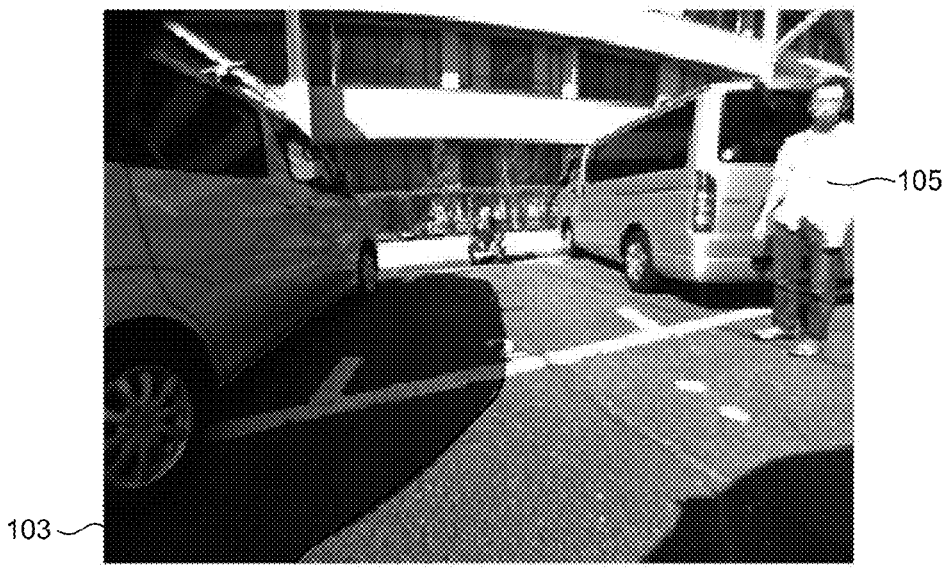
FIG. 4A is a diagram of an example of a captured image according to the first embodiment.
Figure 4B:
FIG. 4B is a diagram of an example of a captured image according to the first embodiment.

FIG. 4A is a diagram of an example of a captured image 103 that is captured from the position 102 by the image capturing unit 11 according to the first embodiment. FIG. 4B is a diagram of an example of a captured image 101 that is captured from the position 100 by the image capturing unit 11 according to the first embodiment. In the example illustrated in FIG. 3, a person 105 is standing in the direction of travel of the car 104. Thus, the person 105 appears in the captured images 101 and 103. Moreover, the position 102 is closer to the person 105 as compared to the position 100. Hence, the person 105 appears larger in the captured image 103 as compared to the captured image 101.

Meanwhile, the installation location, the movement, and the input timing of the image capturing unit 11 are not limited to this case. Alternatively, it is also possible to capture three or more captured images.

Moreover, the image capturing unit 11 obtains internal parameters along with capturing the images. However, in the first embodiment, as illustrated in FIG. 3, since it is assumed that a plurality of captured images is captured using a single image capturing unit 11 (a single camera), the internal parameters of each captured image do not change but remain constant. For that reason, instead of obtaining the internal parameters at the time of capturing each image, the image capturing unit 11 may obtain the internal parameters in advance.

Subsequently, at Step S103, the first estimating unit 13 estimates spatial position relationship between different capturing positions (an example of a first position relationship). More particularly, the first estimating unit 13 makes use of the captured images in chronological order and the internal parameters that are input from the image capturing unit 11, and estimates a rotation matrix and a translation vector that represent the relative position relationship between the capturing positions of the captured images in chronological order.

Figure 5:
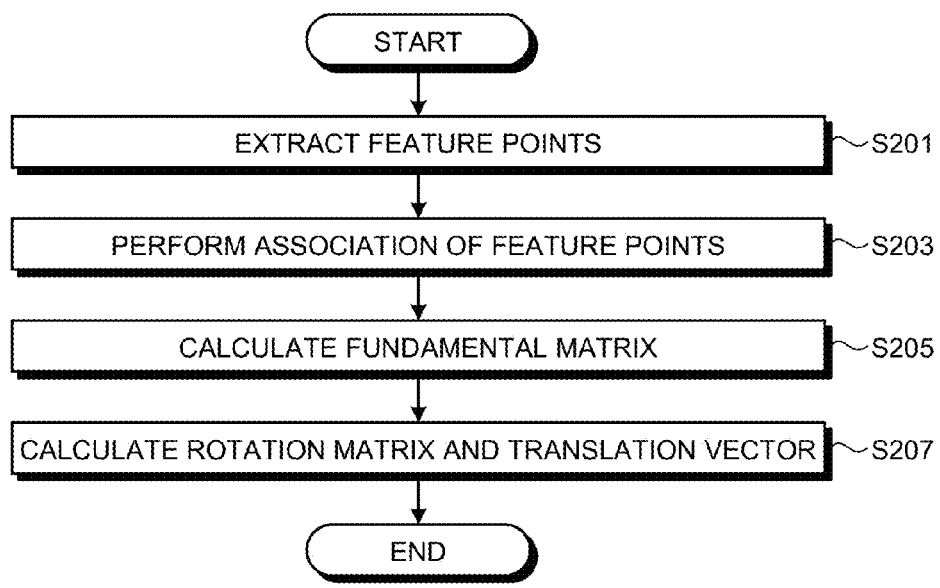
FIG. 5 is a flowchart for explaining an exemplary estimation process performed according to the first embodiment.

FIG. 5 is a flowchart for explaining an exemplary sequence of steps of an estimation process performed according to the first embodiment. In the example illustrated in FIG. 5, the explanation is given about estimating the rotation matrix and the translation vector between the captured images 101 and 103.

Firstly, the first estimating unit 13 extracts feature points from each of the captured images 101 and 103 (Step S201). In order to extract feature points, it is possible to use, for example, the Harris operator.

Then, the first estimating unit 13 performs inter-captured-image association of the feature points extracted from the captured image 103 and the feature points extracted from the captured image 101 (Step S203). For example, the first estimating unit calculates descriptors, which describe features, from the feature points of the captured image 103; obtains the degrees of similarity with the feature points of the captured image 101 according to the calculated descriptors of feature points; and sets the high degrees of similarity (for example, the degrees of similarity equal to or greater than a threshold value) as a congruent points set having high degrees of similarity.

Herein, for example, it is possible to use the luminance of a small area around a feature point as a descriptor. Since that small area includes a plurality of degrees of luminance, the luminance in the small area is expressed as a vector. Regarding the degrees of similarity between the feature points, the SAD (sum of absolute differences) is applied to the luminance in the small area (luminance vector) and a congruent points set of high degrees of similarity is obtained.

Then, the first estimating unit 13 calculates an essential matrix using the congruent points set that is obtained (Step S205). Herein, the first estimating unit 13 may obtain the essential matrix using a known five-point method, and calculates the essential matrix using, for example, Equation (1).

$$x'^T E x = 0 \qquad (1)$$

Herein, E represents the essential matrix; x represents, in a homogenous coordinate system, normalized image coordinates of one image in the congruent points set; and x' represents, in a homogenous coordinate system, normalized image coordinates of the positions of the congruent points in the other image; and T represents transposition. Meanwhile, the normalized image coordinates x and x' in the congruent points set are obtained by converting the congruent points set with internal parameters.

Subsequently, the first estimating unit 13 decomposes the essential matrix using singular value decomposition, and calculates the rotation matrix and the translation vector between the captured images 101 and 103 (Step S207). At that time, there occur four types of indefiniteness in the rotation matrix and the translation vector. In that regard, the first estimating unit 13 may narrow down to one of the four types according to at least either the fact that the rotational change between the capturing positions is small or the fact that the three-dimensional positions of the congruent points is anteriorward.

Then, at Step S105, the second estimating unit 15 refers to a plurality of captured images captured at different capturing positions as well as refers to the position relationship estimated by the first estimating unit 13, and estimates the spatial position and an error position of that spatial position in an estimation-purpose captured image that is one of the plurality of captured images. More particularly, the second estimating unit 15 refers to the captured images in chronological order that are input from the image capturing unit 11 as well as refers to the rotation matrix and the translation vector estimated by the first estimating unit 13, and estimates a three-dimensional position and an error position of that three-dimensional position in the estimation-purpose captured image.

Figure 6A:
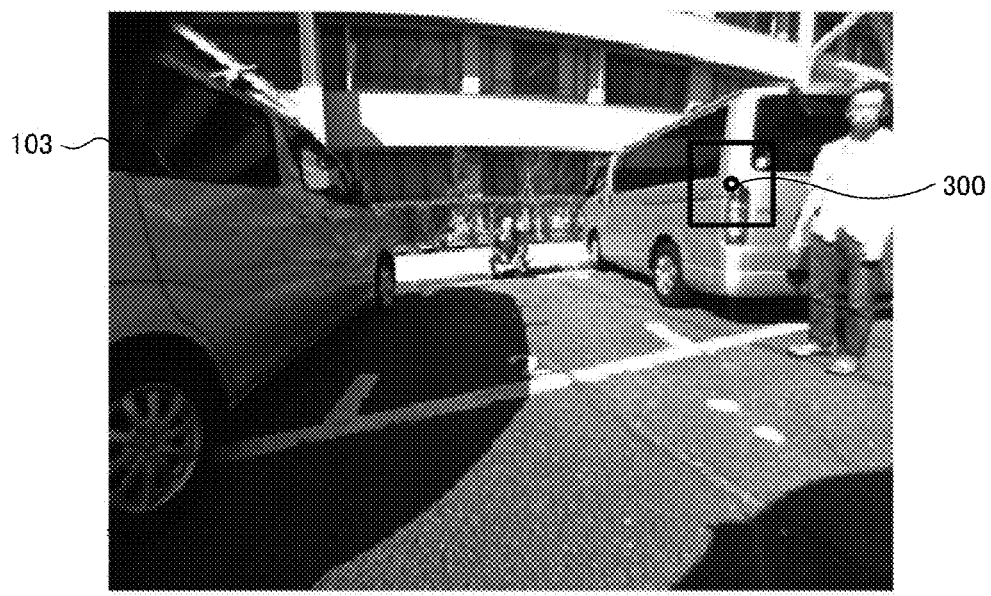
FIG. 6A is a diagram of an example of a captured image according to the first embodiment.
Figure 6B:
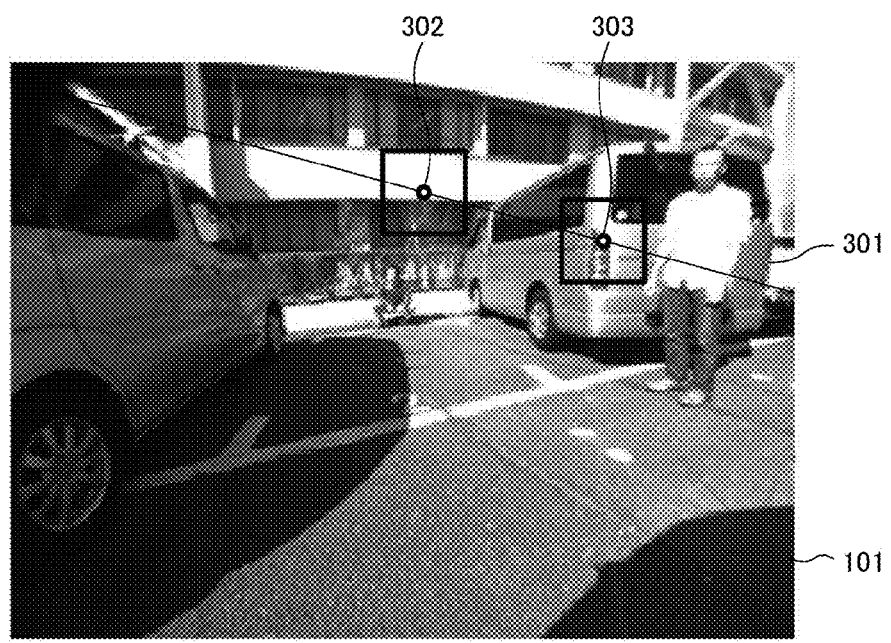
FIG. 6B is a diagram of an example of a captured image according to the first embodiment.

Explained below with reference to FIG. 6A and FIG. 6B is an example in which the three-dimensional position of a point 300 in the captured image 103, which is the estimation-purpose captured image, is estimated. FIG. 6A is a diagram illustrating an example of the captured image 103 according to the first embodiment, and FIG. 6B is a diagram illustrating an example of the captured image 101 according to the first embodiment. Herein, the estimation of a three-dimensional position is performed by establishing association between the captured images 101 and 103, and by estimating the parallax therebetween.

Firstly, the second estimating unit 15 calculates an epipolar line 301 in the captured image 101 using the rotation matrix and the translation vector estimated by the first estimating unit 13; sets arbitrary points (in FIG. 6B, points 302 and 303 are illustrated) on the epipolar line 301, and sets small areas around those arbitrary points. Then, the second estimating unit 15 obtains the degree of similarity between the luminance pattern of the small area around each arbitrary point set on the epipolar line 301 and the luminance pattern of the small area around the point 300; and sets the point having the highest degree of similarity (in FIG. 6B, the point 303) as the congruent point to the point 300. Thus, the second estimating unit 15 obtains the congruent points between the captured images 101 and 103.

Subsequently, using the point 300 and the congruent point 303, the second estimating unit 15 calculates the three-dimensional position of the point 300. Herein, the three-dimensional position of the point 300 may be expressed in Equation (5) using homogenous coordinates of a three-dimensional position as expressed in Equation (2); using homogeneous coordinates of the point 300 as expressed in Equation (3); using homogeneous coordinates of the congruent point 303 as illustrated in Equation (4); and using a 3-by-4 projection matrix P=K(I|0), P'=(R|t) of each of the captured images 103 and 101, where K represents the internal parameter, R represents the rotation matrix, and t represents the translation vector.

$$\tilde{X}_w = (X\ Y\ Z\ 1)^T \quad (2)$$

$$\tilde{m} = (u\ v\ 1)^T \quad (3)$$

$$\tilde{m}' = (u'\ v'\ 1)^T \quad (4)$$

$$\tilde{m} \sim P\tilde{X}_w, \tilde{m}' \sim P'\tilde{X}_w \quad (5)$$

More specifically, the second estimating unit 15 applies the method of least squares to Equation (5) and obtains a three-dimensional position $X_w = (X\ Y\ Z)^T$ of the point 300.

Figure 7:
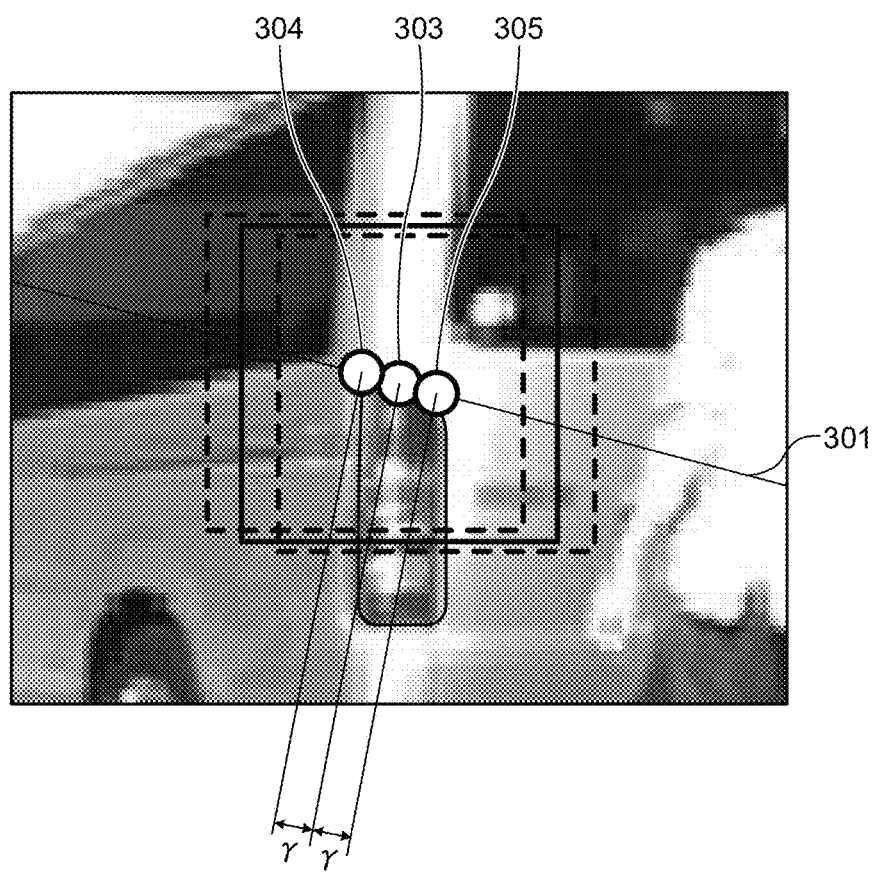
FIG. 7 is an enlarged view a congruent point in the captured image according to the first embodiment.

Then, the second estimating unit 15 determines an error γ of the congruent point 303, and calculates the three-dimensional position of the point 300 in the case when the congruent point 303 shifts by an amount equal to the error γ. Herein, the second estimating unit 15 may obtain the error γ based on a fixed value equal to or smaller than one pixel or based on the step width used in searching on the epipolar line 301 at the time of obtaining the congruent point 303. FIG. 7 is an enlarged view of the congruent point 303 in the captured image 101 according to the first embodiment. Herein, congruent points 304 and 305 that are illustrated in FIG. 7 by taking into account the error γ are expressed in Equation (6).

$$\tilde{m}'' = (u' \pm \gamma_u\ v' \pm \gamma_v\ 1)^T \quad (6)$$

Herein, $\gamma_u^2 + \gamma_v^2 = \gamma^2$ is satisfied, and the congruent points 304 and 305 are positioned on the epipolar line 301.

Then, regarding each of the congruent points 304 and 305 too, the second estimating unit 15 calculates the three-dimensional position by replacing the homogeneous coordinates of the point 303 with the homogeneous coordinates of each of the congruent points 304 and 305.

Subsequently, the second estimating unit 15 performs the abovementioned process of estimating the three-dimensional position of each point other than the point 300 in the captured image 103; and estimates the three-dimensional position at each position in the captured image 103. Meanwhile, in the first embodiment, although the explanation is given for an example in which the captured image 103 is considered to be the estimation-purpose captured image and in which the three-dimensional position of each point in the captured image 103 is estimated, that is not the only possible case. Alternatively, it is possible to consider the captured image 101 to be the estimation-purpose captured image and to estimate the three-dimensional position of each point in the captured image 101.

Then, at Step S107, the third estimating unit 17 estimates the position relationship between the capturing position of the estimation-purpose captured image and the road surface (an example of a second position relationship).

More particularly, the third estimating unit 17 refers to the spatial positions (the three-dimensional positions) estimated by the second estimating unit 15 and estimates the orientation of the image capturing unit 11 and the road surface. However, since the three-dimensional positions estimated by the second estimating unit 15 include estimation errors occurring due to position misplacement, it is not possible to determine such points in the captured image 103 which belong to the road surface.

Figure 8:
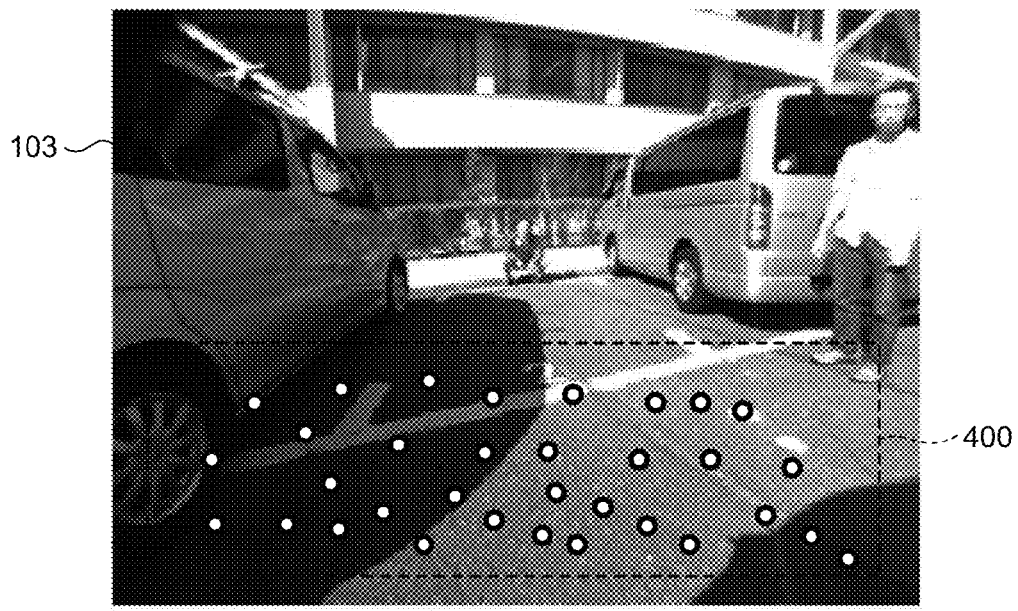
FIG. 8 is a diagram illustrating the captured image according to the first embodiment in which an initial area is set.

In that regard, in the first embodiment, as illustrated in FIG. 8, the third estimating unit 17 sets an initial area 400 in the lower part of the captured image 103, and estimates the planar surface (the road surface) in the three-dimensional space using the three-dimensional position of each point included in the initial area 400. In order to estimate the road surface in a stable manner, it is desirable that the third estimating unit 17 makes use of RANSAC (RANdom Sample Consensus), and examines and evaluates each point included in the initial area 400 by means of random selection. As a result of estimating the road surface in the three-dimensional space in the abovementioned manner, the third estimating unit 17 obtains a normal vector n of the road surface and obtains a distance d between the image capturing unit 11 and the road surface.

Thus, in the first embodiment, the explanation is given for an example in which the three-dimensional positions estimated by the second estimating unit 15 are used in order to obtain the normal vector n of the road surface and the distance d between the image capturing unit 11 and the road surface. However, it is also possible not to use the three-dimensional positions. For example, if the installation angle of the image capturing unit 11 does not change with respect to the road surface, then the normal vector n of the road surface and the distance d between the image capturing unit 11 and the road surface may be obtained at the time of installing the image capturing unit 11. Alternatively, the normal vector n of the road surface and the distance d between the image capturing unit 11 and the road surface may be estimated using a gyro sensor or an acceleration sensor.

Figure 9:
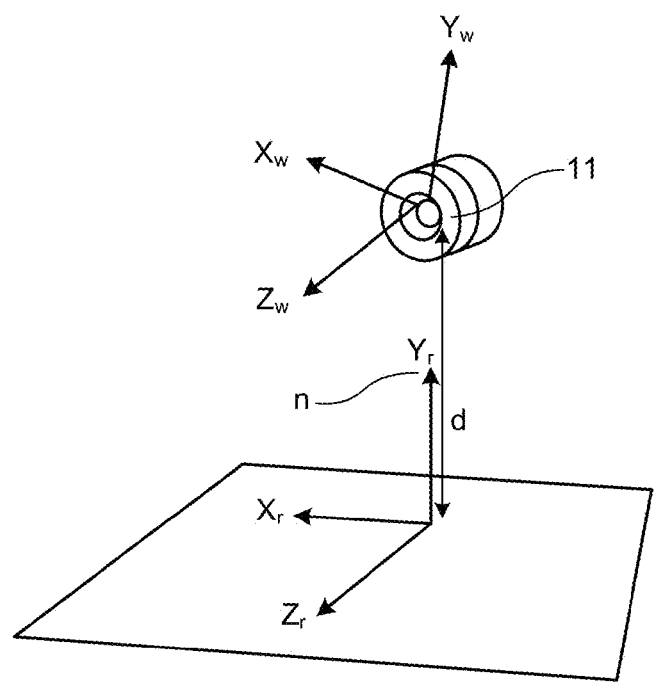
FIG. 9 is a diagram illustrating an exemplary relationship of the positions and the orientations of the image capturing unit and a road surface according to the first embodiment.

Then, as illustrated in FIG. 9, the third estimating unit 17 makes use of the normal vector n=($n_x$, $n_y$, $n_z$) of the road surface and the distance d between the image capturing unit 11 and the road surface, and estimates a rotation matrix $R_p$ and a translation vector $t_p$ that are used in performing coordinate transformation from a coordinate system $X_w$ formed around the image capturing unit 11 into a coordinate system $X_r$ based on the road surface. By performing coordinate transformation from the coordinate system $X_w$ into the coordinate system $X_r$; a $Z_w$ axis in the optical axis direction of the image capturing unit 11 is transformed into a $Z_r$ axis, the direction perpendicular to the road surface is transformed into a $Y_r$ axis, and the axis orthogonal to the $Z_r$ axis and the $Y_r$ axis is transformed into an $X_r$ axis. Moreover, on the road surface, the size of the $Y_r$ axis becomes equal to zero.

Herein, the relationship between the coordinate system $X_w$ and the coordinate system $X_r$ becomes $X_r = R_p^{-1} X_w + t_p$, where $t_p = (0, 0, d)^T$ is satisfied. Moreover, if the rotation matrix $R_p$ is considered to be a general rotation matrix, then it can be expressed as Equation (7).

$$R_p = \begin{pmatrix} C\alpha C\gamma - S\alpha S\beta S\gamma & -C\beta S\alpha & C\gamma S\alpha S\beta + C\alpha S\gamma \\ C\gamma S\alpha + C\alpha S\beta S\gamma & C\alpha C\beta & -C\alpha C\gamma S\beta + S\alpha S\gamma \\ -C\beta S\gamma & S\beta & C\beta C\gamma \end{pmatrix} \quad (7)$$

Herein, $C\alpha = \cos \alpha$ and $S\alpha = \sin \alpha$ is satisfied. Moreover, the same is the case for $\gamma$ and $\beta$.

The third estimating unit 17 sets the coordinate transformation from the coordinate system $X_w$ into the coordinate system $X_r$ in such a way that the direction in which the $Z_w$ axis in the optical axis direction of the image capturing unit 11 is projected on the road surface does not change after coordinate transformation, and the size of the $Y_r$ axis becomes equal to zero on the road surface. As a result, since the normal vector n of the road surface matches with the $Y_r$ axis, $\beta = \arcsin(nz)$ and $\alpha = \arccos(ny/\cos \beta)$ is obtained. Moreover, since the $Z_r$ axis is present on the planar surface extending between the normal vector n and the $Z_w$ axis, $\gamma = 0$ is obtained. In this way, the third estimating unit 17 estimates the rotation matrix $R_p$.

Subsequently, at Step S109, the projecting unit 19 makes use of the second position relationship estimated by the third estimating unit 17; obtains a first projection position by projecting the capturing position of the estimation-purpose captured image on the road surface; obtains a second projection position by projecting the spatial position on the road surface; and obtains a third projection position by projecting the error position on the road surface. Then, the calculator 21 performs updating in such a way that, on the straight line passing through the first projection position and the second projection position, the object existence probability in between the second projection position and the third projection position is greater than the object existence probability in between the first projection position and the third projection position; and then calculates the object existence probability.

Figure 10:
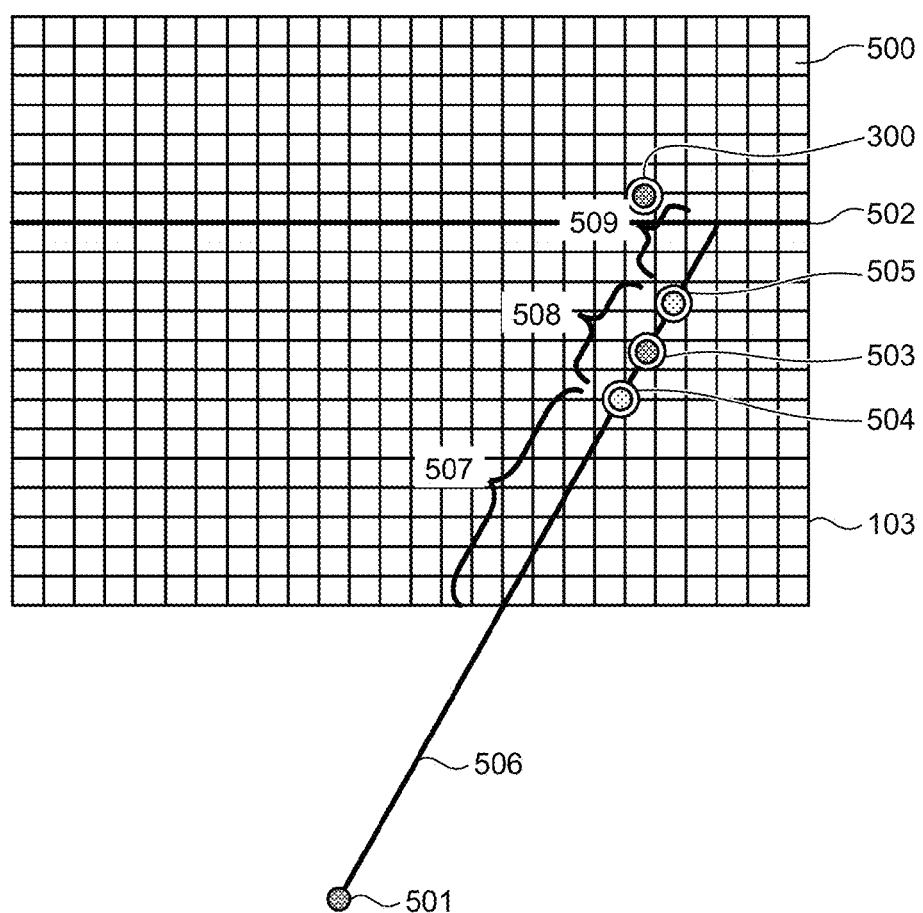
FIG. 10 is an explanatory diagram illustrating an exemplary method of calculating the existence probability of an object according to the first embodiment.

In the first embodiment, as illustrated in FIG. 10, association of the position relationship is performed with the captured image 103, and the object existence probability is calculated on a grid image 500 that is partitioned into small areas for every N number of pixels (an example of an existence probability calculation image). In the example illustrated in FIG. 10, in order to make it easier to understand the correspondence relationship between the captured image 103 and the grid image 500; the grid image 500 is superimposed on the captured image 103. However, in practice, the grid image 500 need not be superimposed on the captured image 103. That is, as long as association of the position relationship between the captured image 103 and the grid image 500 is done, it serves the purpose.

Figure 11:
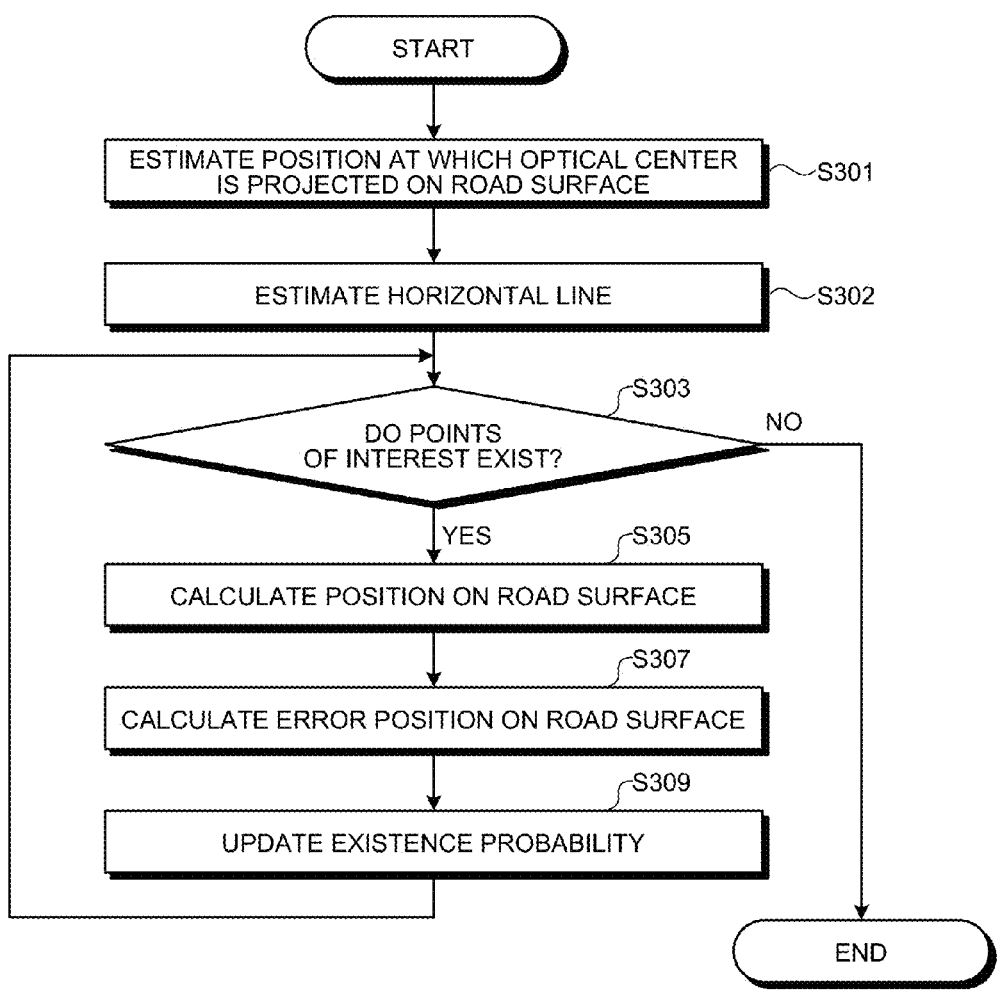
FIG. 11 is a flowchart for explaining an exemplary projection process and an exemplary existence probability calculation process performed according to the first embodiment.

FIG. 11 is a flowchart for explaining an exemplary sequence of steps of a projection process performed in the projecting unit 19 according to the first embodiment and an exemplary sequence of steps of an existence probability calculation process performed in the calculator 21 according to the first embodiment.

Firstly, using Equation (8) and Equation (9), the projecting unit 19 calculates the position at which the capturing position (more specifically, the optical center) of the captured image is projected on the road surface; multiplies 1/N to the calculated position so as to transform the position into the coordinate system of the grid image 500; and estimates a position 501 (Step S301). In this way, the coordinate system of the captured image 103 and the coordinate system of the grid image 500 can be uniquely determined.

$$\tilde{c} \sim P\tilde{X}_p \quad (8)$$

$$\tilde{X}_p = [t_p\ 1]^T \quad (9)$$

Then, the projecting unit 19 calculates a horizontal line on the captured image 103; transforms the calculated horizontal line into the coordinate system of the grid image 500; and estimates a horizontal line 502 (Step S302). More particularly, the projecting unit 19 sets a using Equation (10) and calculates the positions of two points in the captured image 103 using Equation (8) and Equation (9). That happens because $+\alpha$ and $-\alpha$ are set in Equation (10).

$$\tilde{X}_{ph} = (\pm\alpha\ 0\ \infty 1)^T \quad (10)$$

Subsequently, the projecting unit 19 obtains a straight-line equation from the calculated positions of two points so as to obtain a horizontal line in the captured image 103, and then transforms that horizontal line into the coordinate system of the grid image 500 so as to obtain the horizontal line 502.

Subsequently, the projecting unit 19 confirms whether or not any unprocessed points of interest are present in the captured image 103 (Step S303). Herein, a point of interest is such a point in the captured image 103 which was used in estimating a three-dimensional position in the captured image 103 (for example, the point 300 illustrated in FIG. 6A). If unprocessed points of interest are present in the captured image 103 (Yes at Step S303), then the projecting unit 19 sets any one of the unprocessed points of interest (in FIG. 10, the point of interest 300) as the target point for processing. Then, the system control proceeds to Step S305. On the other hand, if there is no unprocessed point of interest in the captured image 103 (No at Step S303), then that marks the end of the process.

Subsequently, the projecting unit 19 calculates a point 503 that represents the position of the point of interest 300, which is set as the target point for processing, on the road surface (Step S305). More particularly, the projecting unit 19 makes use of the rotation matrix $R_p$ and the translation vector $t_p$ estimated by the third estimating unit 17; performs coordinate transformation of a three-dimensional position $X_{w\_}300$ of the point of interest 300 into the coordinate system $X_r$ based on the road surface; and obtains $X_{r\_}300$. Then, in order to obtain the position on the road surface, the projecting unit 19 converts $X_{r'}$_300, which has the $Y_r$ axis equal to zero in size, again into the coordinate system $X_w$ centered around the image capturing unit 11 so as to obtain $X_{w'}$_300; and then puts $X_{w'}$_300 in Equation (5) so as to calculate the point 503.

Subsequently, the projecting unit 19 calculates an anticipated error of the point of interest 300 set as the target point for processing; and calculates points 504 and 505 that represent error positions of the point of interest 300 on the road surface (Step S307). More particularly, when the congruent point 303, which is estimated by the second estimating unit 15, shifts by an amount equal to the error γ (for example, shifts to the congruent points 304 and 305 illustrated in FIG. 7); the projecting unit 19 transforms the three-dimensional position of the point 300 according to Step S305 and calculates the points 504 and 505. Meanwhile, the projecting unit 19 calculates the size of the error using Equation (11).

$$ed = \max(\|m_{504} - m_{503}\|, \|m_{505} - m_{503}\|)^T \qquad (11)$$

Herein, ed represents the size of the error; $m_{50}*$ represents the two-dimensional coordinate of a point 50* in the grid image 500. In the example illustrated in FIG. 10, * is replaced with any one of 3, 4, and 5.

Subsequently, in the grid image 500, the calculator 21 updates the obstacle existence probability, and calculates the obstacle existence probability (Step S309). Then, the system control returns to Step S303. More particularly, the calculator 21 updates the obstacle existence probability in the grid image 500 using Equation (12) or Equation (13).

$$P(E|O) = \frac{P(O|E)P(E_p)}{P(O|E)P(E_p) + P(O|\overline{E})(1 - P(E_p))} \qquad (12)$$

$$P(E|\overline{O}) = \frac{(1 - P(O|E))P(E_p)}{(1 - P(O|E))P(E_p) + (1 - P(O|\overline{E}))(1 - P(E_p))} \qquad (13)$$

Herein, P(E) represents the obstacle existence probability. Moreover, P(E|O) represents an updating expression of the obstacle existence probability in a grid in which the existence of an obstacle has been confirmed; and P(E|$\overline{O}$) represents an updating expression of the obstacle existence probability in a grid in which the existence of an obstacle has not been confirmed. Thus, P(E|O) and P(E|$\overline{O}$) correspond to the case in which the obstacle existence probability P(E) is obtained using conditional probability of whether or not the existence of an obstacle confirmed.

Meanwhile, P($E_P$) represents the obstacle prior probability. Since P($E_P$) represents the obstacle prior probability, it is assumed that the obstacle existence probability in each pre-updating grid is used. However, at the time of performing the process for the first time, it is assumed that an initial value (such as 0.5, which means an intermediate state regarding whether or not an obstacle exists) is used.

P(O|E) represents the probability (detection rate) of obstacle observation when an obstacle exists. Since P(O|E) represents the detection rate, it is set to be Po(0<Po<1). P(O|$\overline{E}$) represents the probability (detection rate) of obstacle observation when an obstacle does not exist. Since P(O|$\overline{E}$) represents the detection rate, it is set to be Pe (greater the error ed, greater becomes Pe within the set range).

Thus, greater the error ed, smaller becomes the updating scope of P(E). For that reason, when P(O|E) is used, P(E) is updated to increase in a gradual manner. On the other hand, when P(O|$\overline{E}$) is used, P(E) is updated to decrease in a gradual manner. That is, greater the spacing between the point 503 and the point 504 or the point 505, smaller is the updating scope with which the calculator 21 updates the existence probability. Meanwhile, in order to satisfy the same tendency, instead of varying P(O|$\overline{E}$); P(O|E) may be reduced within the set range in proportion to the error ed.

Then, in the case of updating the obstacle existence probability within grids, as illustrated in FIG. 10, the calculator 21 updates the existence probability in each grid positioned on a straight line 506 that passes through the position 501 and the point 503.

At that time, in the grids that belong to a section 507 which lies toward the point 501 from the point 504 on the straight line 506, the calculator updates P(E) using Equation (13) under the assumption that the existence of an obstacle has not been confirmed. Moreover, in the grids that belong to a section 508 which joins the point 504 and the point 505 on the straight line 506, the calculator 21 updates P(E) using Equation (12) under the assumption that the existence of an obstacle has been confirmed.

As a result, P(E) gets updated in such way that P(E) decreases in the grids belonging to the section 507 and P(E) increases in the grids belonging to the section 508. Meanwhile, in the grid to which the point 503 belongs, in order to increase P(E), either P(O|$\overline{E}$) may be reduced to be smaller than Pe or P(O|E) may be increased to be greater than Po.

The grids that belong to a section 509, which joins the point 505 on the straight line 506 to the horizontal line 502, correspond to an area in which the point of interest 300 is not observable because it has been observed. However, since there is also a possibility that an obstacle exists, the calculator 21 can update P(E) using Equation (12). At that time, since no obstacle has been directly observed, the calculator 21 further reduces the updating scope of P(E) using a value smaller than Po in P(O|E) so that P(E) gets updated in a more gradual manner.

In this way, if Equation (12) and Equation (13) are set based on the measuring error; in areas having a small error, the updating scope of the obstacle existence probability is updated in a large way, and the presence or absence of an obstacle is conspicuously evident. On the other hand, in areas having a large error, the updating scope of the obstacle existence probability is updated in only a small way, and the presence or absence of an obstacle remains unclear. Hence, the likelihood of false detection can be reduced.

Subsequently, at Step S111, the detector 23 detects the boundary between the road surface and an object using the object existence probability calculated by the calculator 21. More particularly, the detector 23 detects a boundary position between an obstacle and the road surface using the obstacle existence probability calculated by the calculator 21.

Figure 12:
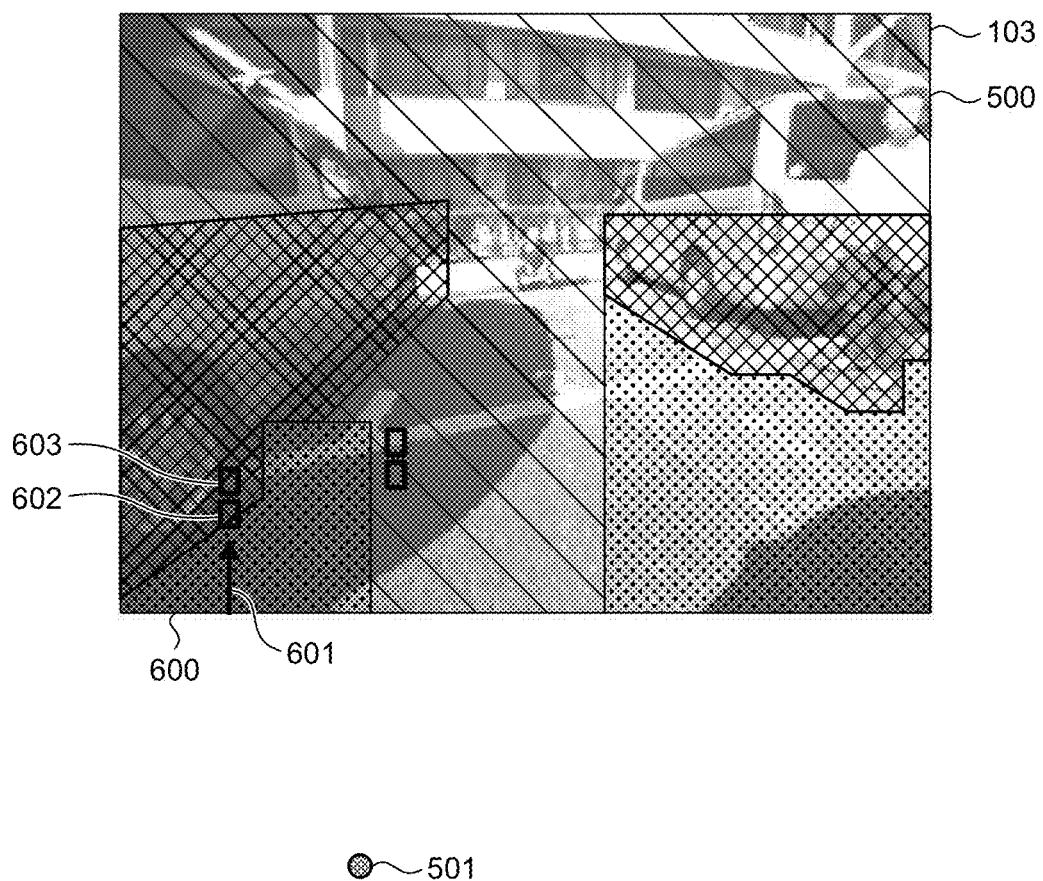
FIG. 12 is a diagram of an example of an obstacle existence probability according to the first embodiment.

FIG. 12 is a diagram of an example in which the obstacle existence probability according to the first embodiment is illustrated in the grid image 500. However, in the example illustrated in FIG. 12, the grid of the grid image 500 is not illustrated. Moreover, in the example illustrated in FIG. 12, regarding the areas represented in grids, the value of P(E) is close to 1.0 and it is highly likely that an obstacle exists. Moreover, regarding the areas represented in dots, it is highly likely that an obstacle does not exist. Furthermore, regarding the area represented in hatched lines, the value of P(E) is close to 5.0 and it is indefinite whether or not an obstacle exists.

Meanwhile, the obstacle existence probability changes in a large way in the neighborhood of the position at which an obstacle makes contact with the road surface. Hence, the detector 23 searches for the grid position having undergone a change in that neighborhood area, and detects the positions at which the obstacle makes contact with the road surface (i.e., detects the boundary position between the obstacle and the road surface). Moreover, since the road surface is inevitably present in between the image capturing unit 11 and the obstacle, the detector 23 searches for the grid positions at which grids not having an obstacle change to grids having an obstacle, and detects the positions at which the obstacle makes contact with the road surface (i.e., detects the boundary position between the obstacle and the road surface).

In that regard, in the first embodiment, the detector 23 considers the direction from an end 600 at the side of the position 501 in the grid image 500 toward the horizontal line 502, that is, considers a direction 601 orthogonal to the end 600; and sets a grid 602 and a grid 603 in the direction from the side close to the end 600 toward the direction 601. Herein, the grid 602 and the grid 603 may be adjacent to each other or may be set in plurality within a range of a predetermined N number of grids. Then, the detector 23 detects the boundary position between the obstacle and the road surface when an obstacle existence probability G(X) in a grid X satisfies at least one of Equation (14) to Equation (16).

$$G(603)-G(602) \geq TH_1 \qquad (14)$$

$$G(602) \geq TH_2 \qquad (15)$$

$$G(603) \geq TH_3 \qquad (16)$$

Herein, $TH_1$ (an example of first threshold value) is assumed to be a positive value; $TH_2$ (an example of second threshold value) is assumed to be equal to or smaller than 0.5; and $TH_1$ (an example of third threshold value) is assumed to be equal to or greater than 0.5. Moreover, G(602) is an example of first existence probability, and G(603) is an example of second existence probability.

Equation (14) represents a condition in which, greater the difference between the grid 602 and the grid 603, higher becomes the likelihood of a boundary. Equation (15) represents a condition that the grid 602 is an area in which no obstacle exists. Equation (16) represents a condition that the grid 603 is an area in which an obstacle exists.

Then, the detector 23 performs the same process by changing the positions along the end 600, and detects the boundary at each position.

Subsequently, at Step S113, the output control unit 25 instructs the output unit 27 to output at least either the object existence probability that is calculated by the calculator 21 or the boundary between the road surface and the object as detected by the detector 23.

Figure 13:
FIG. 13 is a diagram illustrating an exemplary output according to the first embodiment.

For example, as illustrated in FIG. 13, the output control unit 25 may instruct the output unit 27 to output an image formed by superimposing a boundary line 611, which indicates the boundary between the road surface and the object as detected by the detector 23, on the captured image 103. Moreover, when the distance between the car 104 and the obstacle becomes equal to or smaller than a certain distance, the output control unit 25 may instruct the output unit 27 to display a warning sign 610 or to output an audio warning such as a warning tone. Furthermore, depending on the distance between the car 104 and an obstacle, the output control unit 25 may vary the display format of at least either the color, or the thickness, or the degree of transparency, or the interval of blinking of the boundary line 611. For example, with the aim of alerting the driver to an obstacle at a short distance from the car 104, the output control unit 25 displays the boundary line 611 in a thicker manner and displays distant obstacles with an increased degree of transparency. Moreover, for example, if the difference between probability values obtained using Equations (14) to (16) is large or if the probability values are large; the output control unit 25 may vary the display format of at least either the color, or the thickness, or the degree of transparency, or the interval of blinking of the boundary line 611 with the aim of drawing the attention of the driver.

Furthermore, for example, as illustrated in FIG. 12, the output control unit 25 may instruct the output unit 27 to display an image formed by superimposing the obstacle existence probability on the captured image in an identifiable manner. Herein, identifiability of the existence probability may point to visibility due to colors, or brightness proportional to the existence probability, or blinking.

In this way, according to the first embodiment, even in the case when the parallaxes and depths among a plurality of images are not in a constant relationship, it is possible to detect the boundary between an object and the road surface. For that reason, according to the first embodiment, there is no need to install a plurality of image capturing units parallel to the direction of travel of a mobile object (more specifically, there is no need to install a plurality of image capturing units in such a way that (depth Z=fixed value F/parallax d) is satisfied in the images). In contrast, for example, by preconfiguring only a single image capturing unit in a mobile object in a simple manner, it becomes possible to detect the boundary between the object and the road surface.

Moreover, according to the first embodiment, the driver of the mobile object is informed about the detection result about the boundary between the object and the road surface. Thus, the information can be used in supporting safe driving. Thus, in the first embodiment, the explanation is given for an example in which the detection result about the boundary is informed to the driver of the mobile object. However, alternatively, even by using the detection result about the boundary in controlling the mobile object, it becomes possible to support safe driving. In this case, the output unit 27 need not output the existence probability or the boundary.

Second Embodiment

In a second embodiment, the explanation is given for an example in which captured images that are captured in chronological order are input in a sequential manner, and the processes explained in the first embodiment are performed in a temporally continuous manner with respect to the sequentially-input images. In the second embodiment, for example, consider a case when a captured image at a timing $t_1$, a captured image at a timing $t_2$, and a captured image at a timing $t_3$ are input in a sequential manner. In that case, the processes explained in the first embodiment are performed firstly with respect to the captured image at the timing $t_1$ and the captured image at the timing $t_2$. Subsequently, the processes explained in the first embodiment are performed with respect to the captured image at the timing $t_2$ and the captured image at the timing $t_3$. The following explanation is given with the focus on the differences with the first embodiment. Thus, the constituent elements having identical functions as the constituent elements according to the first embodiment are referred to by the same naming/reference numerals; and the explanation thereof is not repeated.

Figure 14:
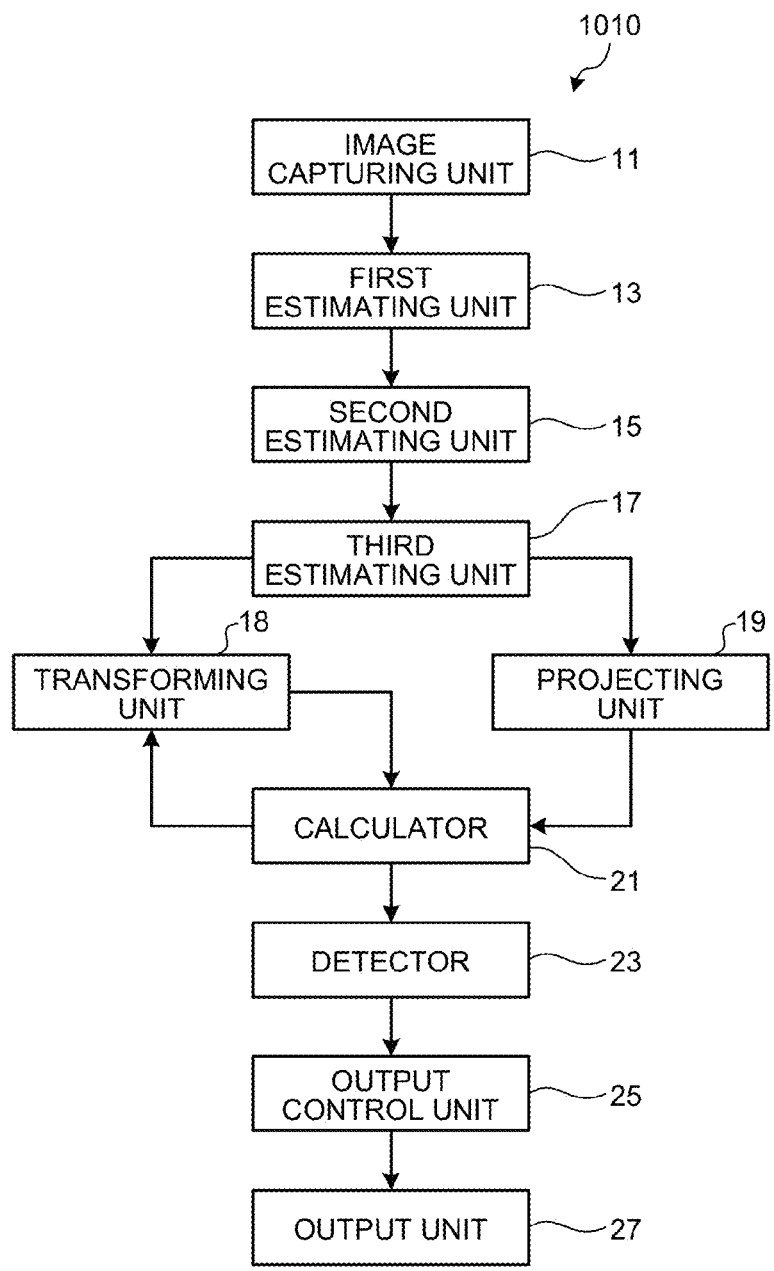
FIG. 14 is a configuration diagram illustrating an example of a detecting device according to a second embodiment.

FIG. 14 is a configuration diagram illustrating an example of a detecting device 1010 according to a second embodiment. As illustrated in FIG. 14, as compared to the first embodiment, the detecting device 1010 according to the second embodiment additionally includes a transforming unit 18.

Figure 15:
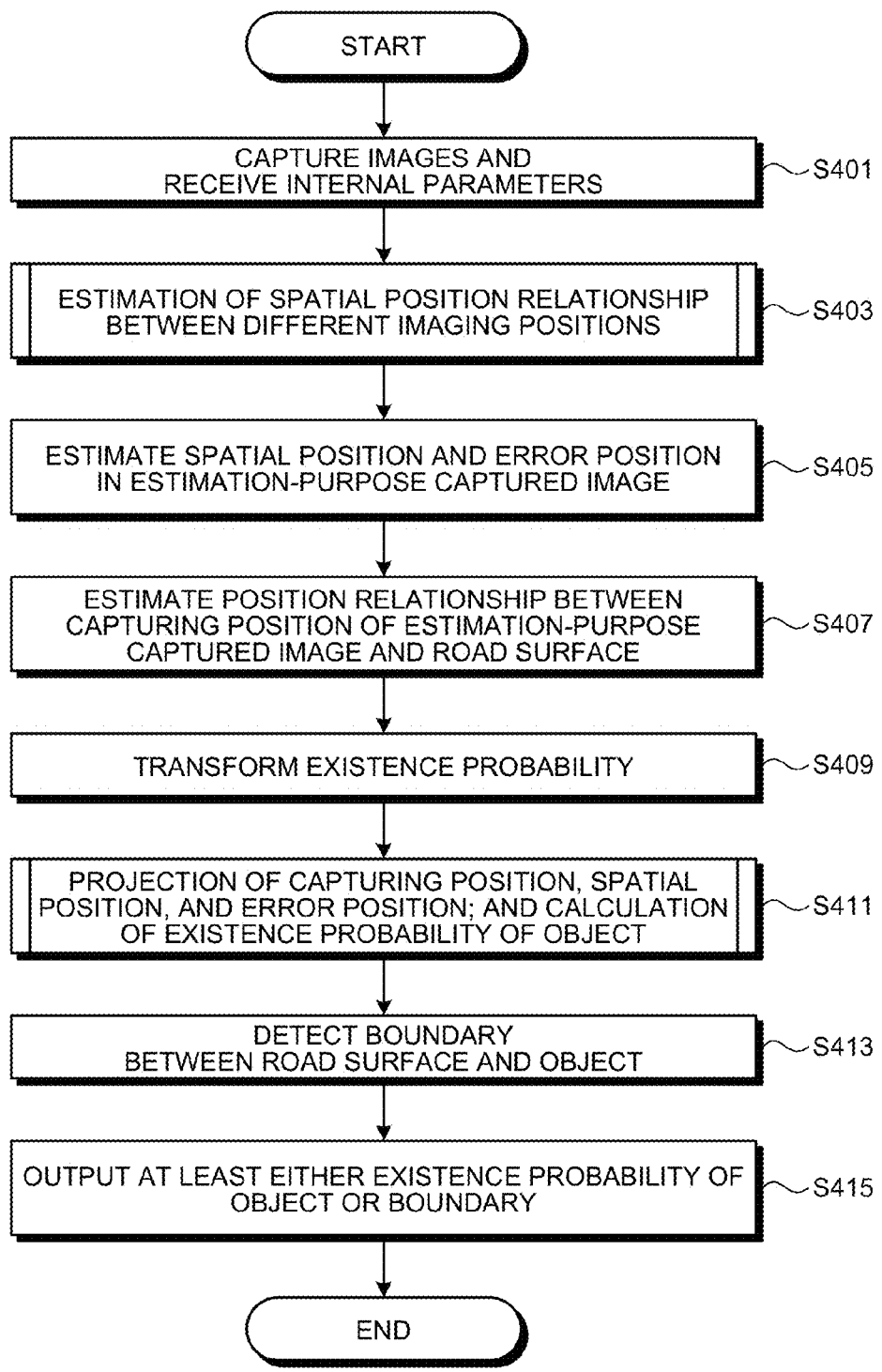
FIG. 15 is a flowchart for explaining an exemplary detecting process performed according to the second embodiment.

FIG. 15 is a flowchart for explaining an exemplary sequence of steps of a detecting process performed in the detecting device 1010 according to the second embodiment. The detection process illustrated in FIG. 15 is firstly performed with respect to the captured image at the timing $t_1$ and the captured image at the timing $t_2$, and then performed with respect to the captured image at the timing $t_2$ and the captured image at the timing $t_3$. Subsequently too, in an identical manner, the detection process illustrated in FIG. 15 is performed with respect to the captured image at a timing $t_n$ (where n is an integer) and the captured image at a timing $t_{n+1}$. Moreover, herein it is assumed that the estimation-purpose captured image is the captured image captured at the latest timing. That is, among the captured image at the timing $t_1$ and the captured image at the timing $t_2$, the captured image at the timing $t_2$ becomes the estimation-purpose captured image. Similarly, among the captured image at the timing $t_2$ and the captured image at the timing $t_3$, the captured image at the timing $t_3$ becomes the estimation-purpose captured image.

Firstly, the steps performed from Step S401 to Step S407 are identical to the steps performed from Step S101 to Step S107 illustrated in FIG. 2. Hence, the explanation of those steps is not repeated.

Then, at Step S409, the transforming unit 18 makes use of a homography matrix with respect to the road surface between the estimation-purpose captured image (for example, the captured image at the timing $t_2$) and a new estimation-purpose captured image that is chronologically subsequent to the estimation-purpose captured image (for example, the captured image at the timing $t_3$), and transforms the existence probability in the grid image 500. However, if the existence probability in the grid image 500 was not calculated at the previous timing, then the transforming unit 18 does not perform existence probability transformation, and sets the obstacle prior probability $P(E_P)$ as the initial value in the grid image 500. Setting of the obstacle prior probability is the same as that of the calculator 21 according to the first embodiment.

That is, in the case when the detection process illustrated in FIG. 15 is being performed with respect to the captured image at the timing $t_1$ and the captured image at the timing $t_2$, the existence probability in the grid image 500 is not calculated at the previous timing, that is, the timing $t_1$. For that reason, the transforming unit 18 does not perform existence probability transformation. On the other hand, in the case when the detection process illustrated in FIG. 15 is being performed with respect to the captured image at the timing $t_2$ and the captured image at the timing $t_3$, the existence probability in the grid image 500 has been calculated at the previous timing, that is, the timing $t_2$. Hence, the transforming unit 18 transforms the existence probability.

More particularly, the transforming unit calculates a homography matrix H given in Equation (17) using the rotation matrix R and the translation vector t estimated by the second estimating unit 15; using the normal vector n of the road surface as estimated by the third estimating unit 17; using the distance d between the image capturing unit 11 and the road surface as estimated by the third estimating unit 17; and using the internal parameter K.

$$H = K\left(R + \frac{tn^T}{d}\right)K^{-1} \quad (17)$$

As is commonly and popularly known, the homography matrix H enables unique determination of the association between the road surface captured in images. Then, the transforming unit 18 transforms the existence probability calculated in the grid image 500 at the previous timing (for example, at the timing $t_2$) into the existence probability (more specifically, the obstacle prior probability $P(E_P)$) calculated in the grid image 500 at the current timing (for example, at the timing $t_3$).

Subsequently, at Step S411, the projecting unit 19 performs the process identical to Step S109 illustrated in FIG. 2. Moreover, the calculator 21 performs the process identical to Step S109 illustrated in FIG. 2 expect for the fact that the obstacle prior probability is not set and the existence probability calculated in the grid image 500 is stored for the transformation purposes.

Then, the steps performed from Step S413 and Step S415 are identical to the steps performed from Step S111 and Step S113, respectively. Hence, the explanation of those steps is not repeated.

In this way, according to the second embodiment, the effect identical to the first embodiment can be achieved in a temporally continuous manner.

Hardware Configuration

Figure 16:
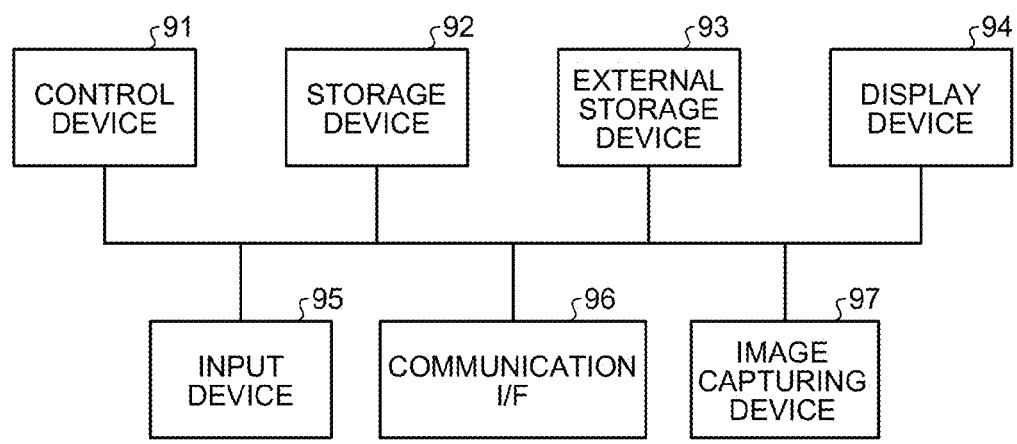
FIG. 16 is a block diagram illustrating an exemplary hardware configuration of the detecting devices according to the embodiments.

FIG. 16 is a block diagram illustrating an exemplary hardware configuration of the detecting devices 10 and 1010 according to the embodiments. As illustrated in FIG. 16, the detecting devices 10 and 1010 according to the embodiments can be implemented using the hardware configuration of a commonly-used computer that includes a control device 91 such as a CPU; a storage device 92 such as a ROM (Read Only Memory) or a RAM (Random Access Memory); an external storage device 93 such as an HDD (Hard Disk Drive) or an SSD (Solid State Drive); a display device 94 such as a display; an input device 95 such as a key switch; a communication I/F 96; and an imaging device 97 such as a car-mounted camera.

The program executed in the detecting devices 10 and 1010 according to the embodiments is stored in advance in a ROM.

Alternatively, the program executed in the detecting devices 10 and 1010 according to the embodiments may be recorded in the form of an installable or executable file in a computer-readable storage medium such as a CD-ROM, a CD-R, a memory card, a DVD, and a flexible disk (FD) as a computer program product.

Still alternatively, the program executed in the detecting devices 10 and 1010 according to the embodiments may be saved as a downloadable file on a computer connected to a network such as the Internet or may be made available for distribution through a network such as the Internet.

Meanwhile, the program executed in the detecting devices 10 and 1010 according to the embodiments contains a module for each of the abovementioned constituent elements to be implemented in a computer. As the actual hardware, for example, the control device 91 reads the computer program from the external storage device 93 and runs it such that the program is loaded in the storage device 92. As a result, the module for each of the abovementioned constituent elements is generated in the computer.

As described above, according to the embodiments, even in the case when the parallaxes and the depths among a plurality of images are not in a constant relationship, the boundary between an object and the road surface may be detected.

The embodiments described above do not limit the scope of the inventions, and modifications thereof may be exemplified without departing from the scope of the inventions. A variety of inventions may be made based on combinations of the components disclosed in the embodiments. For example, some of the components described in the embodiments may be eliminated. Some components among different embodiments may be combined.

For example, unless contrary to the nature thereof, the steps of the flowcharts according to the embodiments described above may have a different execution sequence, can be executed in plurality at the same time, or can be executed in a different sequence every time.

REFERENCE SIGNS LIST

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detecting device comprising:
a processor that executes computer executable components stored in a memory, the computer executable components comprising:
a first estimating unit configured to estimate a first spatial position relationship between different image capturing positions;
a second estimating unit configured to estimate a spatial position of a spatial position in an estimation-purpose captured image and an error position of the spatial position by using a plurality of captured images at the different image capturing positions and the first spatial position relationship, the estimation-purpose captured image being one of the plurality of captured images;
a third estimating unit configured to estimate a second position relationship between the capturing position of the estimation-purpose captured image and a road surface;
a projecting unit configured to
obtain a first projection position by projecting the capturing position of the estimation-purpose captured image on the road surface by using the second position relationship,
obtain a second projection position by projecting the spatial position on the road surface, and
obtain a third projection position by projecting the error position on the road surface;
a calculator configured to calculate an existence probability of an object on a straight line passing through the first projection position and the second projection position by updating the existence probability so that an existence probability of the object in between the second projection position and the third projection position on the straight line is greater than in between the first projection position and the third projection position on the straight line; and
a detector configured to detect a boundary between the road surface and the object by using the calculated existence probability.

2. The device according to claim 1, wherein the greater the spacing between the second projection position and the third projection position, the smaller is updating scope with which the calculator updates the existence probability.

3. The device according to claim 1, wherein the calculator updates the existence probability in an existence probability calculation image that has association of position relationship with the estimation-purpose captured image.

4. The device according to claim 2, wherein the calculator updates the existence probability in an existence probability calculation image that has association of position relationship with the estimation-purpose captured image.

5. The device according to claim 3, wherein the detector detects the boundary when at least one of a condition that the difference between a first existence probability and a second existence probability is equal to or greater than a first threshold value, a condition that the first existence probability is equal to or greater than a second threshold value, and a condition that the second existence probability is equal to or greater than a third threshold value, is satisfied, the first existence probability being an existence probability of the object at a position closer to an end of the existence probability calculation image on a side of the first projecting position in a direction from the end of the existence probability calculation image on a side of the first projecting position toward a horizontal line of the existence probability calculation image, the second existence probability being an existence probability of the object at a position closer the horizontal line.

6. The device according to claim 4, wherein the detector detects the boundary when at least one of a condition that the difference between a first existence probability and a second existence probability is equal to or greater than a first threshold value, a condition that the first existence probability is equal to or greater than a second threshold value, and a condition that the second existence probability is equal to or greater than a third threshold value, is satisfied, the first existence probability being an existence probability of the object at a position closer to an end of the existence probability calculation image on a side of the first projecting position in a direction from the end of the existence probability calculation image on a side of the first projecting position toward a horizontal line of the existence probability calculation image, the second existence probability being an existence probability of the object at a position closer the horizontal line.

7. The device according to claim 3, wherein the executable components further comprise a transforming unit configured to transform the existence probability in the existence probability calculation image by using a homography matrix with respect to a road surface between the estimation-purpose captured image and a new estimation-purpose captured image that is chronologically subsequent to the estimation-purpose captured image,
wherein the calculator updates the existence probability in post-transformation version of the existence probability calculation image that has association of position relationship with the new estimation-purpose captured image.

8. The device according to claim 4, wherein the executable components further comprise a transforming unit configured to transform the existence probability in the existence probability calculation image by using a homography matrix with respect to a road surface between the estimation-purpose captured image and a new estimation-purpose captured image that is chronologically subsequent to the estimation-purpose captured image,
wherein the calculator updates the existence probability in post-transformation version of the existence probability calculation image that has association of position relationship with the new estimation-purpose captured image.

9. The device according to claim 5, wherein the executable components further comprise a transforming unit configured to transform the existence probability in the existence probability calculation image by using a homography matrix with respect to a road surface between the estimation-purpose captured image and a new estimation-purpose captured image that is chronologically subsequent to the estimation-purpose captured image, wherein the calculator updates the existence probability in post-transformation version of the existence probability calculation image that has association of position relationship with the new estimation-purpose captured image.

10. The device according to claim 6, wherein the executable components further comprise a transforming unit configured to transform the existence probability in the existence probability calculation image by using a homography matrix with respect to a road surface between the estimation-purpose captured image and a new estimation-purpose captured image that is chronologically subsequent to the estimation-purpose captured image, wherein the calculator updates the existence probability in post-transformation version of the existence probability calculation image that has association of position relationship with the new estimation-purpose captured image.

11. The device according to claim 3, wherein the existence probability calculation image is partitioned into grids each of which is a small area.

12. The device according to claim 1, wherein the calculator updates the existence probability so that updating scope of the existence probability between either the second projection position or the third projection position to a horizontal position is smaller than updating scope of the existence probability between the first projection position and either the second projection position or the third projection position on the straight line passing through the first projection position and the second projection position.

13. The device according to claim 1, wherein further comprising an output unit configured to output at least one of the existence probability and the boundary.

14. A detection method comprising:

estimating, by a processor, a first spatial position relationship between different image capturing positions;

estimating, by the processor, a spatial position of a spatial position in an estimation-purpose captured image and an error position of the spatial position by using a plurality of captured images at the different image capturing positions and the first spatial position relationship, the estimation-purpose captured image being one of the plurality of captured images;

estimating, by the processor, a second position relationship between the capturing position of the estimation-purpose captured image and a road surface;

obtaining, by the processor, a first projection position by projecting the capturing position of the estimation-purpose captured image on the road surface by using the second position relationship;

obtaining, by the processor, a second projection position by projecting the spatial position on the road surface;

obtaining, by the processor, a third projection position by projecting the error position on the road surface;

calculating, by the processor, an existence probability of an object on a straight line passing through the first projection position and the second projection position by updating the existence probability so that an existence probability of an object in between the second projection position and the third projection position on the straight line is greater than in between the first projection position and the third projection position on the straight line; and detecting, by the processor, a boundary between the road surface and the object by using the calculated existence probability.

15. A computer program product comprising a non-transitory computer-readable medium containing a program embodied therein, the program, when executed by a processor, causing the processor to execute at least:

estimating a first spatial position relationship between different image capturing positions;

estimating, a second estimating unit, a spatial position of a spatial position in an estimation-purpose captured image and an error position of the spatial position by using a plurality of captured images at the different image capturing positions and the first spatial position relationship, the estimation-purpose captured image being one of the plurality of captured images;

estimating a second position relationship between the capturing position of the estimation-purpose captured image and a road surface;

obtaining a first projection position by projecting the capturing position of the estimation-purpose captured image on the road surface by using the second position relationship;

obtaining a second projection position by projecting the spatial position on the road surface;

obtaining a third projection position by projecting the error position on the road surface;

calculating an existence probability of an object on a straight line passing through the first projection position and the second projection position by updating the existence probability so that an existence probability of an object in between the second projection position and the third projection position on the straight line is greater than in between the first projection position and the third projection position on the straight line; and detecting a boundary between the road surface and the object by using the calculated existence probability.

\* \* \* \* \*